3,025,170
METHOD OF TREATING POULTRY
John F. Murphy, Park Forest, Ill., and Robert E. Murphy, Chicago, Ill., assignors to Swift & Company, Chicago, Ill., a corporation of Illinois
No Drawing. Filed Sept. 6, 1957, Ser. No. 682,302
15 Claims. (Cl. 99—194)

This invention relates to a method of handling poultry and, more particularly, is directed to improving the appearance of poultry and to methods of reducing product shrink and bacterial contamination in poultry processing operations.

Under present practice, poultry is shipped live to a plant where the birds are bled, scalded, defeathered, eviscerated, and chilled. Chilling is customarily accomplished by holding the carcasses in a tank containing a mixture of ice and water for a period of from about 4 to about 24 hours. After the birds have been chilled to a body temperature of about 33° F. to about 40° F. they are usually packed in crates with ice and shipped to the retail trade. Occasionally the birds are cut up and packed individually in trays prior to shipment. They may also be frozen either whole or in parts, and placed in plastic bags for distribution to retail outlets.

In the past, it has been found necessary to ship poultry in nonrefrigerated, insulated trucks. The industry relied on ice packing to maintain a low temperature rather than mechanical refrigeration because of the fact that cold air moving in refrigerated trucks caused excessive product dehydration. Even birds covered with ice lost a considerable amount of moisture under these conditions.

It would be advantageous to both the consumer and to the processor if poultry could be shipped under mechanical refrigeration. This would eliminate the need for ice in shipping containers and would prevent excessive moisture drippage on the product and in the storage areas.

It is, therefore, an object of the present invention to provide a method of treating poultry which reduces product shrink during processing and handling.

Another object of the invention is to provide a process wherein poultry can be dry packed without causing excessive surface dehydration.

One of the important considerations in poultry handling lies in the tendency of the product to spoil before it can be placed on the market. This rapid deterioration takes place even where birds are held at refrigeration temperatures of 40° F. or lower. Inasmuch as the short shelf life of poultry (from one to two weeks) is mainly due to microbial growth, precautions must be taken to reduce the bacterial count on the surface of the birds during processing. In particular, it is advantageous to eliminate bacteria from chill tanks and from the skin of poultry which have a toxic history such as those in the coliform group and organisms such as Staphylococcus.

A further object of this invention, therefore, is to provide a method of processing poultry which reduces the bacterial count on the skin of the product and in chill tanks.

Most scalding operations are carried out at a temperature of about 128° F. At this temperature, the birds are said to be low scalded. Although a high scald treatment (about 140° F.) produces a cleaner and whiter bird which is easier to defeather, processors prefer to use the lower temperature when possible because high scalding results in the removal of a thin, waxlike tissue called the "cuticle" from the skin of the birds. The loss of the cuticle often causes excessive product dehydration during subsequent handling.

Still another object of the invention, therefore, is to provide a method of processing high scald poultry which prevents excessive moisture loss from the product.

Yet another object of the invention is to provide a method of handling poultry which produces lighter colored and better appearing birds.

Other objects not specifically set forth herein will become readily apparent to one skilled in the art from the following detailed description of the invention.

Generally, the present invention comprises the discovery that poultry treated with certain acid solutions will show less tendency to dehydrate during storage and handling than poultry processed in the usual manner. It has been found that this treatment will also lower the bacterial count on the surface of the poultry and will improve the appearance of the product. These results are obtained where the poultry is treated with solutions containing particular amounts of lactic acid, hydrochloric acid, citric acid, and other water soluble acids.

The following examples are illustrative of the present invention and are not to be considered as restrictive thereof.

*Example I*

Thirty birds were dispatched, scalded at 128° F., defeathered, and eviscerated according to standard plant procedures. The birds were divided into lots of 10 and each group was chilled in tanks containing from 0 to 0.17% lactic acid. After a 24 hour chill period, the birds were dry packed in open slotted, wooden boxes and stored in a cooler maintained at 40° F. The weight of the birds was taken immediately before they were placed in storage and after they had been stored for 48 hours. The following weights were recorded and the degree of shrink noted:

| Description | Initial Packed Weight, Grams | Packed Wt. After 48 Hours, Grams | Shrink, Grams | Percent Shrink |
|---|---|---|---|---|
| Lot #1—Standard Chill Control | 11,860 | 11,165 | 695 | 5.8 |
| Lot #2—0.15% lactic acid added to chill water | 13,164 | 12,527 | 637 | 4.8 |
| Lot #3—0.17% lactic acid added to chill water | 12,654 | 12,105 | 549 | 4.3 |

As is evident from the above data, dry packed poultry shows excessive shrink even when subjected to a low scald process. In those birds treated with lactic acid, however, shrink was reduced by as much as 1.5%. This improvement is even more apparent in situations where a high scald treatment (140° F.) is employed.

*Example II*

A plant scale test was conducted to determine whether dry packing of poultry was economically feasible when compared with standard ice packing of poultry. Ordinarily, dry packed birds show a much greater degree of shrink than do ice packed poultry processed under identical conditions. In this test, a large number of birds were cooled for 24 hours in a tank containing ice and water along with 0.16% lactic acid. After the cooling period, random samples of the poultry were packed either dry or with ice in wooden cases. Where ice was used, the cases held only 12 birds whereas 20 birds were placed in each dry packed case. The cases were then shipped through regular trade channels and stored under normal conditions. Six days after the packing date the birds were taken from the cases and weighed. It was found that an identical amount of shrink had occurred regardless of whether the birds had been ice packed or dry packed. These results demonstrated that dry packing of birds produced results comparable to ice packed poultry where the subject invention was employed.

*Example III*

The standard method of chilling poultry includes holding the birds in a tank containing ice and water for from 4 to about 24 hours. Recently, however, a two cycle chill system has been developed whereby birds are chilled under mechanical agitation for about 10 minutes in about 50° F. water and then are subjected to a 10 minute agitated chill in about 33° F. water.

Thirty birds divided into lots of 5 each were high scalded and subjected to the above described continuous chill process. From 0 to 0.9% lactic acid was added to the second cycle chill water. After chilling, the birds were dry packed in open slotted, wooden boxes and were stored in a cooler maintained at 40° F. The following weights of the birds were recorded immediately prior to storage and after a 48 hour storage period:

| Description | Initial Packed Wt., Grams | 48 Hr. Wt., Grams | Shrink, Grams | Percent Shrink |
|---|---|---|---|---|
| 1. No acid added | 5,874 | 5,482 | 392 | 6.6 |
| 2. 0.5% Lactic acid | 6,794 | 6,486 | 308 | 4.5 |
| 3. 0.6% Lactic acid | 6,676 | 6,433 | 243 | 3.6 |
| 4. 0.7% Lactic acid | 6,761 | 6,513 | 248 | 3.6 |
| 5. 0.8% Lactic acid | 6,146 | 5,917 | 229 | 3.7 |
| 6. 0.9% Lactic acid | 6,105 | 5,907 | 198 | 3.2 |

As is shown above, there was a substantial reduction in product shrink when the birds were chilled in an acid solution, rather than in untreated chill water. These tests also demonstrated the practicality of applying the subject method to continuous chill procedures.

*Example IV*

In addition to making poultry more resistant to dehydration, the chilling of birds in an acid medium of the present invention also lowers the bacteriological count of the chill water and on the surface of the birds, thereby producing poultry having a longer shelf life than birds processed under normal conditions. To illustrate this bacteriocidal activity, analyses were made of chill water and birds after a 4 hour chill in tanks containing 0% and 0.12% lactic acid. The tanks were purposely contaminated with known cultures of organisms obtained from spoiled birds.

| Condition | Total Bacterial Count | Staphylococcus | Coliform | Pseudomonas |
|---|---|---|---|---|
| 1. 4 hr. chill water no treatment | 130,000 | 400 | 700 | 3,200 |
| 2. 4 hr. chill water 0.12% lactic acid added | 400 | <100 | <100 | <100 |
| 3. Skin swab no treatment | 250,000 | 40,000 | 8,300 | 20,000 |
| 4. Skin swab Lactic acid process at 0.12% level | 5,300 | 700 | <100 | <100 |

From the above, it is evident that the acid process is especially effective against pseudomonas organisms which are mainly responsible for off condition odors and slime on poultry. The treatment also eliminates Staphylococcus and coliform organisms which cause food poisoning.

*Example V*

The effectiveness of water soluble acids other than lactic acid as additives in the present invention were tested by chilling several groups of four birds each for 24 hours in an ice slush containing particular percentages of boric acid, trichloroacetic acid, hydrochloric acid, and citric acid. After a storage period of 96 hours, the group weights of birds chilled in solutions containing (a) 0.12 percent boric acid and (b) 0.12 percent trichloroacetic acid, respectively, weighed 3.13 percent and 4.03 percent more than a like number of control birds. Correspondingly, birds chilled in ice slush plus 0.10 percent hydrochloric acid and ice slush plus 0.50 percent citric acid weighed 6.7 percent and 8.9 percent more than the control birds after a 72 hour storage period.

*Example VI*

Two groups of twenty birds each were chilled in an ice slush for 24 hours. To one of the tanks was added 0.16 percent lactic acid. Following the chill period, the birds were ice packed and held for 5 days. At the end of this time, the birds treated with lactic acid weighed 1.2 percent more than the control product. Analysis of two other groups stored for 7 days after a like chilling operation showed the lactic acid treated birds to weigh 0.5 percent more than the control birds.

Although lactic acid is a preferred additive because of its low cost and freedom from taste and odor, other water soluble acids such as hydrochloric, citric, boric, phosphoric, etc., and in particular other monobasic hydroxy acids such as hydroxybutyric acid and hydroxyvaleric acid can be substituted for lactic acid in the present invention. All of these compounds are edible when used in proper concentrations, and would have no toxic effect on the poultry meat. The concentration of the additive will vary according to—

(1) The length of time in which the solution is in contact with the birds, and (2) The strength (dissociation constant) of the acid.

We have found that an aqueous medium containing from about 0.05% to about 0.25% of the water-soluble acid to be used is suitable. Lower percentages can be used. In conventional 24 hour chilling practices, for example, concentrations as low as 0.01 percent HCl, lactic and other strong acids satisfactorily reduce shrink and bacterial contamination. Where an instant dip or a continuous chilling operation is employed whereby the birds are in contact with a solution containing the acid for at least about one minute, an acid concentration of about 0.35% is satisfactory. However, the concentration of the acid may be increased to as high as 10 percent or more, especially where weak acids such as acetic acid are used. It has been found that a concentration of about 0.1 percent to 0.18 percent lactic acid is adequate where the birds are chilled for 24 hours in a conventional ice slush.

Obviously many modifications and variations of the invention as hereinbefore set forth may be made without departing from the spirit and scope thereof, and therefore, only such limitations should be imposed as are indicated in the appended claims.

We claim:

1. An improvement in a method of processing poultry which comprises: immersing recently dressed poultry for at least about one minute in an aqueous solution containing a minor amount satisfactory to reduce shrink in said poultry of a water-soluble acid that is edible in the concentration used, said minor amount varying with the length of time of immersion from at least about 0.01% to about 0.35%.

2. An improved method as in claim 1, wherein the acid is lactic acid.

3. An improved method as in claim 1, wherein the acid is citric acid.

4. An improved method as in claim 1, wherein the acid is hydrochloric acid.

5. An improvement in a method of processing poultry which comprises: chilling the recently dressed birds in an aqueous medium containing from about 0.05% to about 0.25% of an edible water soluble acid for at least about 4 hours.

6. An improved method as in claim 5, wherein the acid is lactic acid.

7. An improved method as in claim 5, wherein the acid is citric acid.

8. An improved method as in claim 5, wherein the acid is hydrochloric acid.

9. An improvement in a method of processing poultry wherein a continuous chill process is employed which comprises: dipping recently dressed birds in an aqueous solution containing from about .35% to about 10% of an edible water soluble acid for at least about one minute.

10. An improved method as in claim 9, wherein the acid is latic acid.

11. An improved method as in claim 9, wherein the acid is citric acid.

12. An improved method as in claim 9, wherein the acid is hydrochloric acid.

13. In the chilling of poultry wherein recently dressed birds are placed in a tank containing ice and water for a period of between about 4 and 24 hours, the improvement comprising: incorporating in said water at least about 0.01% of a strong water-soluble acid that is edible in the concentration used, and placing said recently dressed birds therein whereby said birds will show less tendency to dehydrate during storage.

14. A method of reducing shrink in dressed poultry during processing and handling which comprises: immersing recently dressed poultry in an aqueous solution containing at least about 0.35% of an edible water-soluble acid for at least about 1 minute.

15. In the chilling of poultry wherein recently dressed birds are placed in a bath containing ice and water for a period of between about 4 and 24 hours the improvement comprising: incorporating in said water between about 0.1 and 0.18% lactic acid and placing said recently dressed birds in said bath whereby the birds so chilled will show less tendency to dehydrate during storage.

References Cited in the file of this patent

UNITED STATES PATENTS

| | | |
|---|---|---|
| 2,673,804 | Paddock | Mar. 30, 1954 |
| 2,681,287 | Starr | June 15, 1954 |
| 2,687,961 | Ellis | Aug. 31, 1954 |
| 2,866,708 | Broquist et al. | Dec. 30, 1958 |
| 2,930,702 | Winterbottom et al. | Mar. 29, 1950 |

FOREIGN PATENTS

| | | |
|---|---|---|
| 748,617 | Great Britain | May 9, 1956 |

OTHER REFERENCES

"Foods Industries," November 1935, page 533, article entitled Acid Cure For Meat.

"Journal of The American Medical Association," Mar. 3, 1956, pp. 779 and 780, article entitled Chlortetracyline, a Food Preservative.